US007307462B2

(12) United States Patent
Cheng et al.

(10) Patent No.: US 7,307,462 B2
(45) Date of Patent: Dec. 11, 2007

(54) SELF-OSCILLATING DRIVER WITH SOFT START CIRCUIT

(75) Inventors: Xiao-chang Cheng, San Jose, CA (US); Edgar Abdoulin, Woodland Hills, CA (US)

(73) Assignee: International Rectifier Corporation, El Segundo, CA (US)

( * ) Notice: Subject to any disclaimer, the term of this patent is extended or adjusted under 35 U.S.C. 154(b) by 595 days.

(21) Appl. No.: 10/831,807

(22) Filed: Apr. 26, 2004

(65) Prior Publication Data

US 2004/0223277 A1 Nov. 11, 2004

Related U.S. Application Data

(60) Provisional application No. 60/465,250, filed on Apr. 24, 2003.

(51) Int. Cl.
*H03K 17/16* (2006.01)
*H03K 3/017* (2006.01)
(52) U.S. Cl. .................. 327/175; 327/423; 327/108
(58) Field of Classification Search ............. None
See application file for complete search history.

(56) References Cited

U.S. PATENT DOCUMENTS 4,625,271 A * 11/1986 Chetty et al. .............. 363/49

| | | | |
|---|---|---|---|
| 5,663,667 A * | 9/1997 | Blum et al. | 327/134 |
| 6,100,677 A * | 8/2000 | Farrenkopf | 323/285 |
| 6,229,366 B1 * | 5/2001 | Balakirshnan et al. | 327/172 |
| 6,597,221 B2 * | 7/2003 | Hall et al. | 327/175 |
| 6,611,154 B2 | 8/2003 | Grasso et al. | 326/83 |
| 2002/0109471 A1 | 8/2002 | Adams et al. | 315/363 |
| 2003/0001609 A1 | 1/2003 | Grasso et al. | 326/27 |
| 2003/0035260 A1 | 2/2003 | Shearon et al. | 361/93.7 |

FOREIGN PATENT DOCUMENTS

DE     32 41 668     5/1984

* cited by examiner

*Primary Examiner*—Kenneth B. Wells
*Assistant Examiner*—Terry L. Englund
(74) *Attorney, Agent, or Firm*—Ostrolenk, Faber, Gerb & Soffen, LLP

(57) ABSTRACT

A driver circuit for a transistor provides a soft start feature where pulses provided to the transistor are varied in duration during startup. The driver also provides an overcurrent protection feature for disabling a driver output for a safe period of time when an overcurrent condition is detected. The driver circuit includes an oscillator that produces a saw tooth wave and a narrow width pulse train for determining pulse width and dead time, respectively. The driver circuit may be used in half-bridge or full-bridge drivers.

8 Claims, 9 Drawing Sheets

SELF-OSCILLATING DRIVER WITH SOFT START CIRCUIT

CROSS-REFERENCE TO RELATED APPLICATION

The present application is based on and claims the benefit of U.S. Provisional Application No. 60/465,250, filed Apr. 24, 2003, entitled HALF BRIDGE DRIVER, to which a claim of priority is hereby made, and which is hereby incorporated into the present application in its entirety.

BACKGROUND

1. Field of the Invention

The present invention relates generally to self-oscillating drivers, and relates more particularly to self-oscillating drivers with fault protections.

2. Description of Related Art

Transistor drivers are used in a number of applications including full-bridge and half-bridge switching arrangements used to drive a load. For example, full-bridge circuits are used to operate DC-Bus converters, HID lamps and other well known industrial applications. Half-bridge drivers are also used for DC-DC converters and fluorescent lamps.

The above types of applications may incorporate a driver that uses an oscillating signal to provide switching pulses to the full or half-bridge circuits. During startup conditions, the oscillator operates at a frequency that provides signals to gate drivers, for example, to immediately begin switching the full or half-bridge switches at startup. This type of immediate startup operation can have an impact on the ruggedness of the full or half-bridge switching components, that is, numerous startup conditions of this type can result in deterioration of the characteristics of the components and lead to unwanted circuit failures.

In a number of the applications discussed above, the full or half-bridge switching circuits drive a primary side of a load, to transfer power to a secondary side of a load, such as through a transformer. In the event of an overcurrent condition, the full or half-bridge switching circuit can be disabled to prevent component failure or damage, on either the primary or secondary side of the load. Previous full and half-bridge driver circuits provide automatic restarts in the event of an overcurrent event to attempt to operate the circuit once a fault condition has been removed. In these instances, an automatic restart can occur before the full or half-bridge circuit has recovered from the overcurrent stress.

It would be desirable to provide a full or half-bridge driver with a soft start feature and to protect against overcurrent conditions.

SUMMARY

In accordance with the present invention, there is provided a driver control that is self-oscillating and responsive to overcurrent fault conditions. The oscillation frequency is programmable by external components to provide a pulse train that can be selectively delivered to the switches of the full-bridge or half-bridge circuit. A pulse steering circuit is provided to direct the appropriate pulses from a pulse train to the drivers for the full-bridge or half-bridge switches. The driver circuit includes dead time between switching pulses that is programmable by external components and level shift circuitry with DV/DT protection.

The driver circuit provides component and circuitry protection, including responses to undervoltage or overcurrent conditions, as well as a soft start feature to avoid potentially damaging transients at turn-on. A current sense input is provided to attain a feedback function to determine when overcurrent conditions may exist.

In the event of a fault, the driver circuit incorporates a shutdown mode to permit the load time to recover from an overcurrent condition. In this shutdown mode, the signals to the switch drivers are disabled and a shutdown timing capacitor is gradually charged to provide a shutdown period. Once the capacitor reaches a particular threshold, the full-bridge driver is re-enabled to permit the full-bridge circuit to continue operation.

Other features and advantages of the present invention will become apparent from the following description of the invention which refers to the accompanying drawings.

DETAILED DESCRIPTION OF THE PREFERRED EMBODIMENTS

Figure 1:
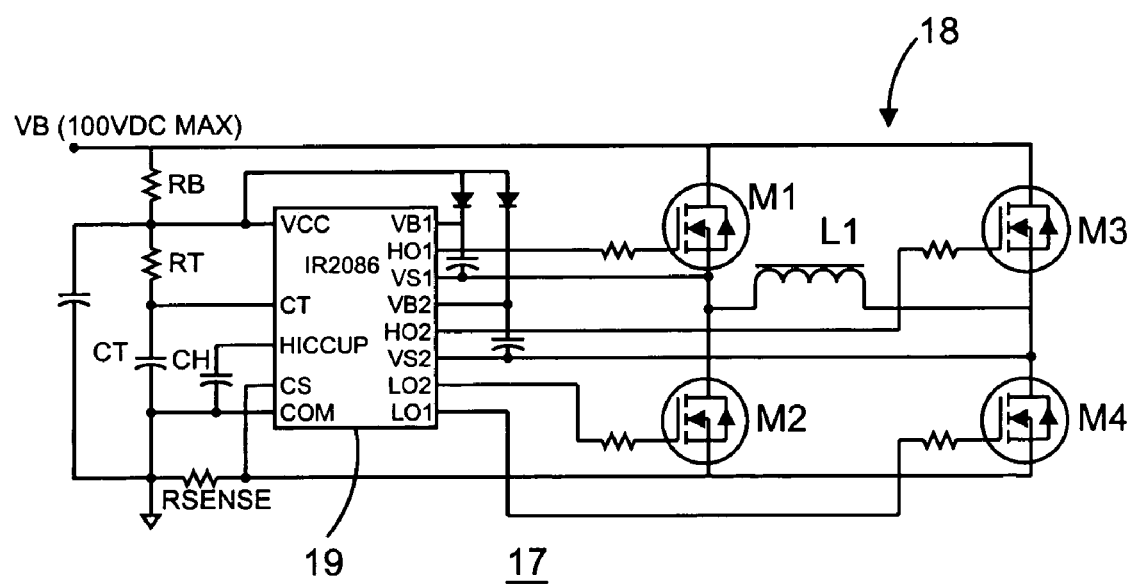
FIG. 1 is a circuit diagram of a typical full-bridge circuit operated with a single controller in accordance with the present invention.

Referring now to FIGS. 1-9, various application circuits using drivers in accordance with the present invention are illustrated, in addition to block diagrams of different embodiments of the driver circuits. Referring to FIG. 1, a full-bridge application circuit 18 is illustrated with a full-bridge driver 19 in accordance with the present invention. Full-bridge driver 19 provides outputs for each of the switches M1-M4 in full-bridge circuit 18. In addition, driver circuit 19 provides independent reference connections VS1, VS2, for each of the half-bridge circuits that make up full-bridge circuit 18.

Driver circuit 19 is a self-oscillating full-bridge primary driver operable at high voltage, e.g., 200 volts, and high speed, e.g., up to 1 MHz. Driver circuit 19 also provides dead time operation and coordination, with dead time values of less than 20 ns. Driver circuit 19 also provides a number of fault protections, including undervoltage protection, soft start protection and overcurrent protection. In accordance with a particular feature of the present invention, driver circuit 19 provides a period of time after an overcurrent fault detection during which output drivers are disabled. This term is sometimes referred to as "HICCUP" mode in this description and accompanying drawings.

The HICCUP circuit and mode are provided in driver circuit 19 to assist with overcurrent recovery to protect switches M1-M4 in full-bridge circuit 18, and also to assist with overcurrent recovery in the load driven by full-bridge circuit 18, illustrated in FIG. 1 as an inductor L1. HICCUP mode is engaged for overcurrent protection as the result of a comparison of the voltage on current sense input CS with a 250 millivolt internal reference. If an overcurrent condition is detected, driver circuit 19 is shut down for a programmable period to permit full-bridge circuit 18 to recover from the overcurrent condition. The secondary, or load, connected to full-bridge circuit 18 is provided enough time to recover from the overcurrent stress brought about by the overcurrent condition. In typical operation, a large capacitor CH is connected to input HICCUP of driver circuit 19. When an overcurrent condition is detected, the outputs of driver circuit 19 are disabled and capacitor CH begins to charge slowly towards voltage VCC. As the voltage on capacitor CH increases, an enabling threshold is approached, at which point the outputs of driver circuit 19 are re-enabled. Once the voltage on capacitor CH reaches a desired threshold, the outputs of driver circuit 19 are re-enabled and capacitor CH is discharged to ground or COM.

Resistor RT and capacitor CT in application circuit 17 of FIG. 1 operate to determine the frequency of the oscillator provided in driver circuit 19. By particularly setting the value of capacitor CT, the dead time between switching the switches in the two half-bridges that make up full-bridge circuit 18 can be varied. That is, by adjusting the value of capacitor CT, the dead time between switching switches M1, M2 and switching switches M3, M4 can be adjusted to a desired value.

Figure 2:
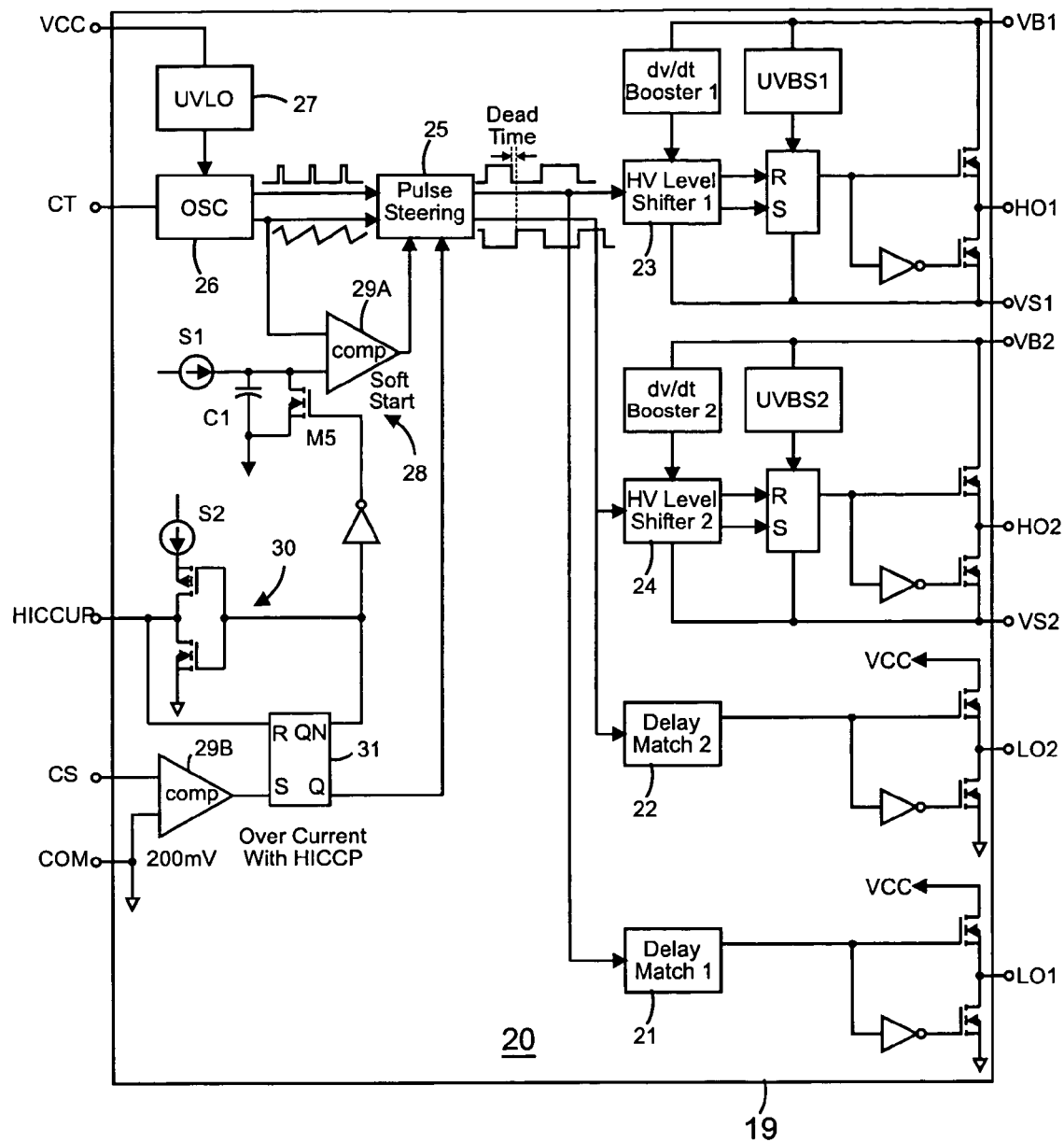
FIG. 2 is a schematic block diagram of the full-bridge driver according to the present invention.

Referring now to FIG. 2, a schematic block diagram 20 is illustrated showing the internal operation of full-bridge driver circuit 19. Diagram 20 shows high and low side drivers for both half-bridge circuits that make up full-bridge circuit 18. Outputs HO1 and HO2 supply switching signals for the high side switches M1, M3 of full-bridge circuit 18, while outputs LO1 and LO2 provide switching signals for the low side switches M2, M4. Low side signals LO1 and LO2 are referenced to VCC, and have delay match circuits 21, 22, respectively. High side outputs HO1 and HO2 are independently referenced to voltages VS1, VB1 and VS2, VB2, respectively. Accordingly, voltages VS1 and VS2 can float at different reference levels, as can voltage references VB1 and VB2.

The signals supplied to outputs HO1 and H02 are level shifted to be referenced to voltage references VS1, VS2, respectively. Level shifters 23, 24 receive a pulse train from pulse steering block 25 and shift the pulse signals to the appropriate voltage reference to provide an accurate switching signal output on HO1 and H02. Pulse steering block 25 also inserts a desired dead time between complimentary switching signals, as determined in part by the value of capacitor CT coupled to input CT in diagram 20. Pulse steering block 25 receives a pulse signal and a saw tooth signal from oscillator 26, the frequency of the saw tooth and pull signals being determined by a combination of external components resistor RT and the capacitor CT. The pulse width generated by oscillator 26 determines the dead time produced by pulse steering block 25. By modifying the value of external capacitor CT, the pulse width of the pulses in the pulse train provided by oscillator 26 may be varied, thereby varying the dead time generated by pulse steering block 25.

Oscillator 26 receives power from voltage VCC to generate the oscillator output signals. During startup, or if a supply voltage fault occurs, UVLO block 27 disables oscillator 26 until a safe condition is produced to permit the oscillator to generate signals. In an exemplary embodiment, UVLO block 27 operates by providing an upper and lower threshold for supply voltage VCC, so that if supply voltage VCC goes beyond the range of the upper and lower threshold, oscillator 26 is disabled. Alternately, UVLO block 27 can be made to operate on pulse steering block 25 to disable the switching signal pulse trains provided to the high and low side drivers.

Diagram 20 also illustrates a soft start circuit 28 that provides additional protection during start up or after undervoltage or overcurrent events or faults. Soft start circuit 28 operates by discharging a capacitor C1 through a switch M5 that is turned on during undervoltage or overcurrent conditions. Comparator 29A disables operation of pulse steering block 25 when the voltage on capacitor C1 drops below a voltage value produced by oscillator 26. When driver circuit 19 is restarted, current source S1 trickle charges capacitor C1 to supply voltage VCC over approximately 2500 oscillator cycles. The gradually rising voltage on capacitor C1 is compared to a saw tooth signal provided by oscillator 26 to enable pulse steering block 25, thereby producing a soft start. It should be apparent that the soft start feature can be provided only upon startup, or upon startup and after fault recovery or in a variety of other situations and conditions.

Comparator 29A in soft start circuit 28 compares the increasing voltage on capacitor C1 to the saw tooth waveform from oscillator 26 and produces a signal to help adjust a pulse width in pulse steering block 25. Pulse steering block 25 modifies the input saw tooth waveform from oscillator 26 to produce a series of complimentary pulse trains. The pulse trains produced by pulse steering block 25 are preferably derived by comparing the saw tooth waveform value to a threshold, and switching a switch when the saw tooth waveform value crosses the threshold. Thresholds are provided on both an upper and lower level, so that a pulse can be derived from the sloped shape of the saw tooth waveform, where the saw tooth waveform crosses both thresholds to provide an upward pulse transition and a downward pulse transition on each threshold crossing, respectively. The output of comparator 29A serves to elongate the pulses provided by pulse steering block 25, because comparator 29A compares the rising edge of the saw tooth waveform to the rising reference value provided by capacitor C1. As capacitor C1 charges to VCC, the pulses in the pulse train from pulse steering block 25 are influenced less and less by the output of comparator 29A and eventually become a predetermined length.

Driver circuit 19 also provides overcurrent protection based on a current sense feedback provided on pin CS. A voltage provided on pin CS is typically produced with a sensing resistor RSENSE (FIG. 1), which produces a voltage based on the current drawn through full-bridge circuit 18. The voltage on pin CS in diagram 20 is compared with a comparator 29B to an internal voltage reference that can vary with the selected application. In the example shown, diagram 20 illustrates a 200 millivolt reference, which acts as a threshold over which an overcurrent condition is indicated. The internal voltage reference can vary depending on the application, for example, from about 25 millivolts to about 250 millivolts. The output of comparator 29B is supplied to an RS flip flop, the output of which is used to enable or disable pulse steering block 25.

A HICCUP mode circuit 30 is also provided to contribute to overcurrent protection. HICCUP mode circuit 30 is coupled to an external capacitor CH (FIG. 1) that is charged during a HICCUP period to provide a time interval during which pulse steering block 25 is disabled. Because the HICCUP capacitor CH is external to driver circuit 19, it can be selectively chosen to program the HICCUP time period as desired. When an overcurrent condition occurs as determined by comparator 29B, and RS flip flop 31 is set, so that the inverting output enables HICCUP mode circuit 30 to trickle charge HICCUP capacitor CH. Current source S2 provides the trickle charge of HICCUP capacitor CH through a CMOS switch in HICCUP mode circuit 30. When the voltage value on HICCUP capacitor CH reaches a given threshold, such as a standard logic voltage level, RS flip flop 31 is reset, causing the inverted output to go to a logic level "1," thereby disabling HICCUP mode circuit 30. When HICCUP mode circuit 30 is disabled, HICCUP capacitor CH is immediately discharged to the common voltage reference level. Typically, external HICCUP capacitor CH is a large value capacitor so that the HICCUP period is made long enough to permit the full-bridge circuit 19 and a secondary load to recover from an overcurrent condition of avoiding component damage. RS flip flop 31 is constructed so that a non-inverting output is set to a logic "1" level when both inputs of RS flip flop 31 are at a high logic level "1." Accordingly, HICCUP mode circuit 30 may be disabled by connecting the HICCUP pin to supply voltage VCC. In such circumstances, the overcurrent protection is still provided as intended through the current sense on pin CS.

Figure 3:
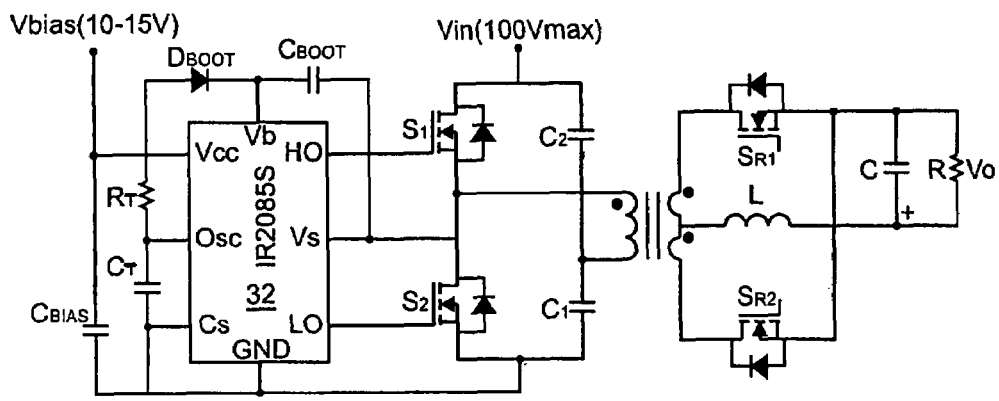
FIG. 3 is a circuit diagram illustrating a half-bridge driver application according to the present invention.

Referring now to FIG. 3, a driver circuit 32 is shown for driving a half-bridge connected pair of switches S1, S2 in accordance with the present invention. Half-bridge driver circuit 32 provides the same protections and features as full-bridge driver circuit 19 in driving a half-bridge circuit. Accordingly, driver circuit 32 has eight pins and may be provided in a very compact package. As with driver circuit 19, driver circuit 32 is a high speed, high voltage, self-oscillating driver that typically operates with a 50% duty cycle. The switching frequency provided by driver circuit 32 can range up to 500 KHz on each switching channel, e.g., HO and LO. As with driver circuit 19, driver circuit 32 can provide a +/−1 amp drive current capability that is optimized for low charge MOSFET switches. Driver circuit 32 also features an adjustable dead time in the range of about 15 nanoseconds to 200 nanoseconds. Driver circuit 32 offers floating channel operation with a boot strap feature capable of 100 volts DC supply. As with driver circuit 19, driver circuit 32 provides high and low side pulse with matching to within approximately +/−25 nanoseconds. Adjustable overcurrent protection is also available, as is undervoltage lockout (UVLO) protection coupled with internal fault start features. A typical application for half-bridge driver 32 is illustrated in FIG. 3 as a DC Bus converter, typically operating at voltage levels of 36-75 volts. Another typical application for driver circuit 32 is push pull converters without restriction on input voltage.

The oscillator frequency of driver circuit 32 is set by the combination of resistor RTN capacitor CT where fosc is approximately equal to 1/(2*RT·CT). Dead time is controlled through selection of capacitor CT. The internal soft start feature increases pulse width during power up and maintains pulse with matching for the high and low outputs throughout the startup cycle. The soft start feature can be engaged at power up or after overcurrent or undervoltage fault conditions. For example, a soft start can be engaged after an undervoltage condition causes an undervoltage lockout when the supply voltage VCC is less than approximately 7.5 volts DC.

Figure 4:
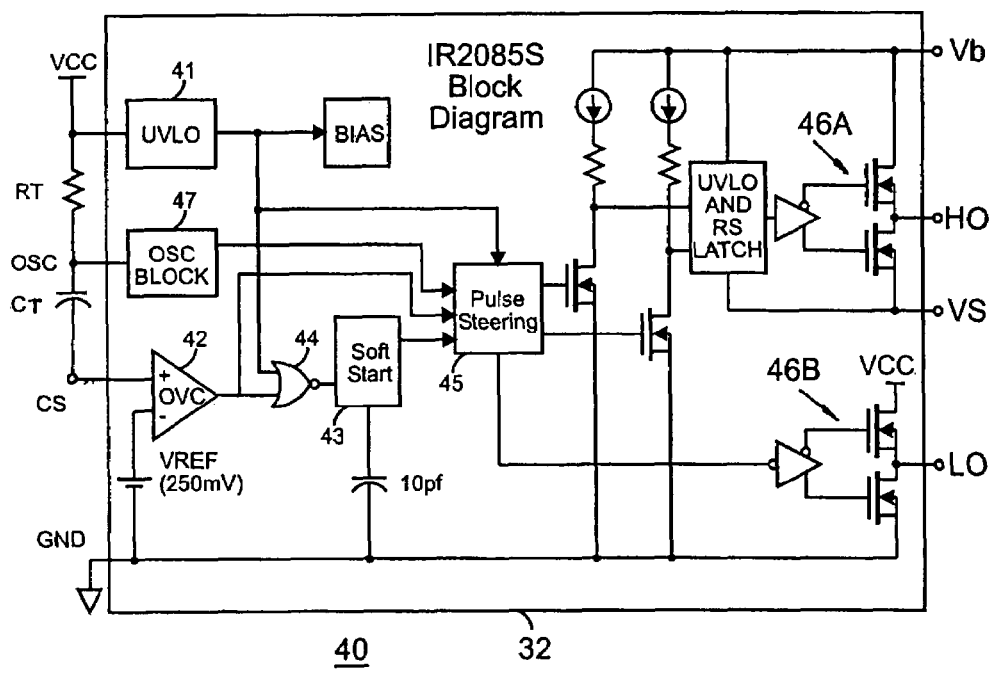
FIG. 4 is an internal schematic block diagram of a half-bridge driver according to the present invention.

Referring now to FIG. 4, an internal diagram of half-bridge driver circuit 32 is illustrated as diagram 40. The external connections to driver circuit 32 are explained as follows. Input VCC is the IC bias input connection to driver circuit 32. The quiescent VCC current is very low and the total supply current is higher depending upon the charge of the MOSFET gate connected to output pins HO and LO, and the programmed oscillator frequency. Total VCC current is the sum of quiescent VCC current and the average current at output pins HO and LO. With the operating frequency fosc and the MOSFET gate charge QG, the average current is expressed as:

$$I_{AVE}=Q_G \times f_{OSC}$$

Typically, a bypass ceramic capacitor is connected to voltage VCC and GND to avoid noise difficulties. The bypass ceramic capacitor is preferably placed as close as possible to driver circuit 32. UVLO block 41 provides undervoltage lockout for IC by a supply voltage VCC. In an exemplary embodiment, UVLO block 41 provides a threshold voltage of approximately 9.5 volts, so that driver circuit 32 is enabled when voltage VCC is above the threshold. UVLO block 41 helps to prevent asymmetrical gate signals on outputs HO and LO, which may be expected when voltage VCC is between approximately 7.5 volts and 8.5 volts.

Input pin OSC provides the oscillator programming functionality and is connected to a timing resistor RT, a timing capacitor CT, and an oscillator block 47. The timing resistor RT is typically coupled between voltage VCC and pin OSC, while timing capacitor CT is typically coupled between pins CS and OSC. In a typical application, the range of values for the timing resistor RT is between 10 kilohms and 100 kilohms, while the timing capacitor CT typically takes on a value between 47 pf and 470 pf. The use of a timing resistor with a value of less than 10 kilohms is not recommended. For best performance, the timing components are placed as close as possible to driver circuit 32. In addition, the ground and voltage VCC traces should be separated near the timing components RT and CT.

Input pin CS provides a feedback current sense signaled to comparator 42 to be evaluated against a threshold value. As shown in FIG. 4, a typical reference threshold value, VREF, is approximately 250 millivolts. When the voltage value on pin CS exceeds the voltage reference value, pulse steering block 45 is disabled so that no outputs are provided on pins HO and LO. In addition, in an overcurrent condition detected through comparator 42 initiates a soft start cycle through soft start block 43. An undervoltage condition detected in UVLO block 41 can also initiate a soft start cycle, as indicated with norgate 44. The GND pin acts as the signal and power ground for all functions in driver circuit 32. Because driver circuit 32 operates with high current and high frequency, a low impedance circuit board ground plane is recommended for connection to pin G and D.

Input VB is the high side power input connection to supply power to the high side driver. The high side supply provided on pin VB is typically derived from a boot strap circuit using a low leakage Shottky diode D boot (FIG. 3) and a ceramic capacitor C boot (FIG. 3). Diode D boot and capacitor C boot are preferably located close to driver circuit 32 to avoid noise issues, and VCC voltage traces are preferably separated from high side supply traces connected to pin VB.

Pin HO is the high side gate drive output pin used to drive the gate of a power MOSFET directly without the need of external buffers. A driver circuit 46A provides the power switching operation to supply signals on output pin HO and are capable of sinking 1.2 amp currents. Pin HO is preferably located close to the gate of a driven high side MOSFET to avoid propagation delays and distortion of the drive signal supplied to the high side MOSFET. The driven high side MOSFET is preferably a low charge MOSFET to prevent shoot through currents.

Pin VS is the high side power return connection and is preferably connected directly to the source terminal of the high side MOSFET with traces that are as short as possible. Pin LO is the low side gate drive output pin to drive a low side power MOSFET directly. A driver circuit 46B is similar to driver circuit 46A with complementary operation.

Figure 5:
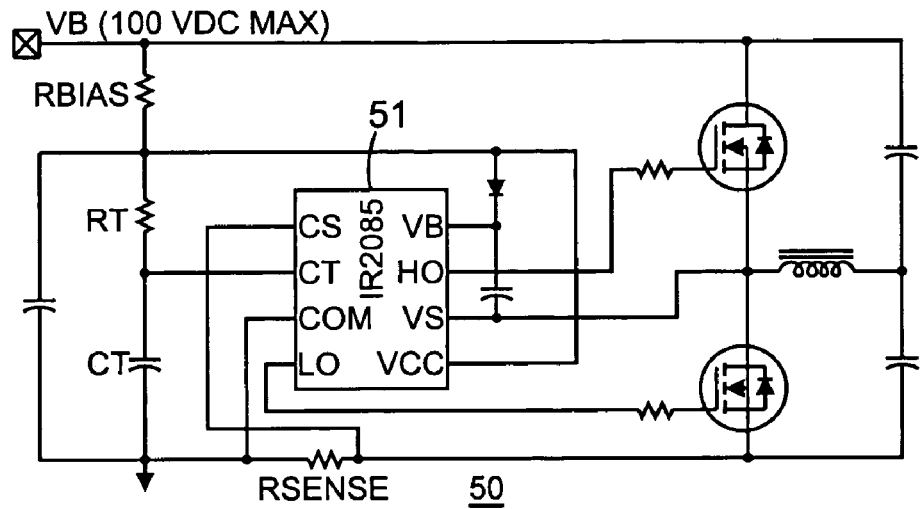
FIG. 5 is a diagram of an application circuit for a half-bridge driver according to the present invention.

Referring now to FIG. 5, another embodiment of a half-bridge driver according to the present invention is illustrated in a typical application circuit as circuit 50. A driver circuit 51 is illustrated in circuit 50 for operating a high and low side switch in a half-bridge configuration. Driver circuit 51 includes a number of features such as an internal 10 volt supply voltage VCC clamp circuit, an external cycle-by-cycle overcurrent shutdown and an undervoltage lockout in an internal soft start similar to previously discussed embodiments. Driver circuit 51 is a self-oscillating high speed high voltage half-bridge driver that may be used in half or full-bridge converters as a primary side driver. Driver circuit 51 can operate at up to 100 volts DC Bus voltage or as a push pull driver without restrictions on bus voltage. Timing resistor RT and timing capacitor CT operate to set the oscillation frequency of driver circuit 51 according to the equation:

$$f_{osc}=1/(1.4RT \cdot CT)$$

Each channel, that is output pins HO and LO, are operable at the oscillation frequency fosc. The internal soft start circuit increases pulse width supplied on outputs HO and LO on power up while maintaining an equal pulse with four HO and LO outputs throughout the startup cycle. An internal 10 volt DC clamp diode provides power to driver circuit 51 directly from the input bus VB. As discussed above, undervoltage lockout prevents operation of the outputs in an exemplary embodiment if supply voltage VCC is less than approximately 7.5 volts DC.

Figure 6:
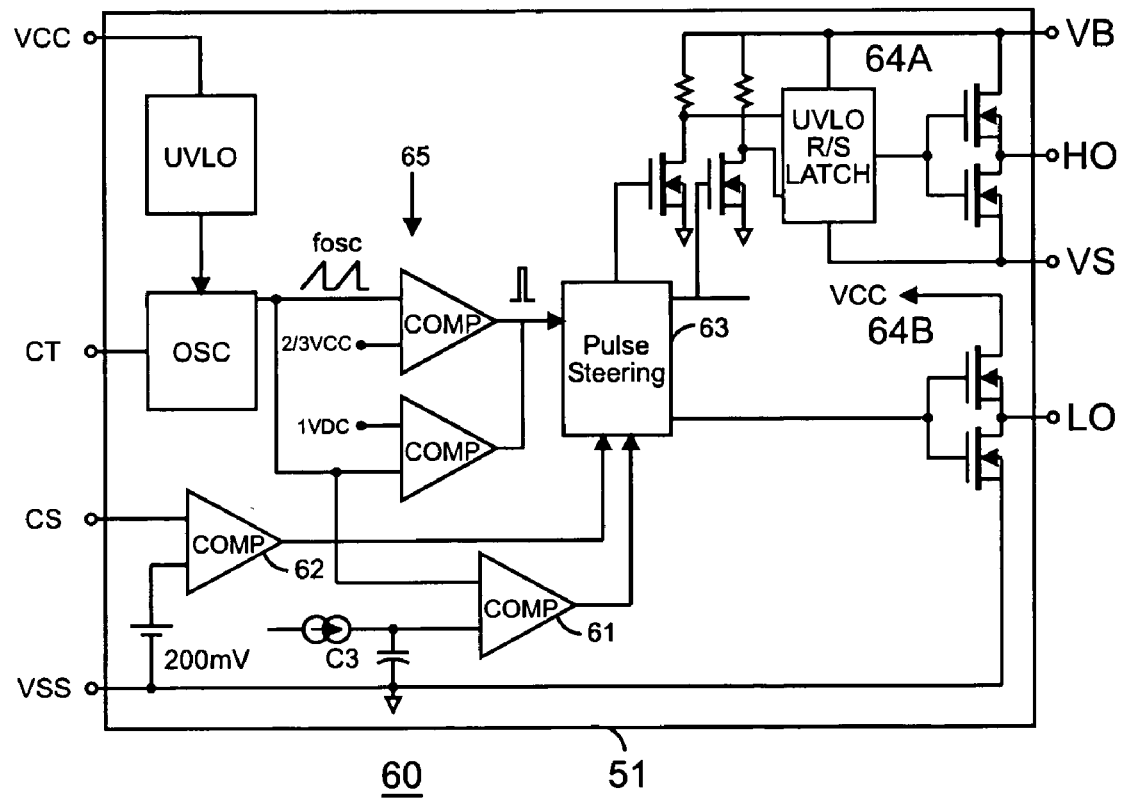
FIG. 6 is an internal schematic block diagram of a half-bridge driver according to the present invention.

Referring now to FIG. 6, an internal schematic block diagram of driver circuit 51 is illustrated as diagram 60. Driver circuit 51 includes an integrated soft start capacitor C3, which is coupled to comparator 61. The soft start circuit may be configured to engage at power up and after every overcurrent condition, or only at power up, for example. A current sense comparator 62 compares the input current sense signal on pin CS to a voltage reference that can have a value of anywhere between 25 and 250 millivolts, for example, to disable a pulse steering block 63 when the current sense voltage is above the reference voltage. Pin CS is typically connected to a sense resistor through which a current representative of a half-bridge current is passed to obtain a feedback current signal. The current value is measured as a voltage on pin CS to determine when an overcurrent condition exists. Alternatively, pin CS may be connected to the output of a logic circuit that provides a logic shutdown operation for protecting driver circuit 51 and the connected power components. Drivers 64A and 64B for the high and low side outputs, respectively are operable to sink or source a peak current of at least 1 amp. High side floating supply voltage VB can float above a common ground reference level up to approximately 150 volts.

Oscillator output and pulse shaping circuitry 65 provides a saw tooth wave with a frequency of fosc and a pulse train with a width determined by the amount of time the input saw tooth wave remains below 1 volt DC and above ⅔ VCC. The soft start circuit operates by comparing the saw tooth wave to the voltage on capacitor C3 to increase the width of the pulses provided to the high and low side driver circuit 64A, 64B. In diagram 60, a UVLO function is supplied at the high side driver to disable the high side output in the event of an undervoltage lockout condition.

Figure 7:
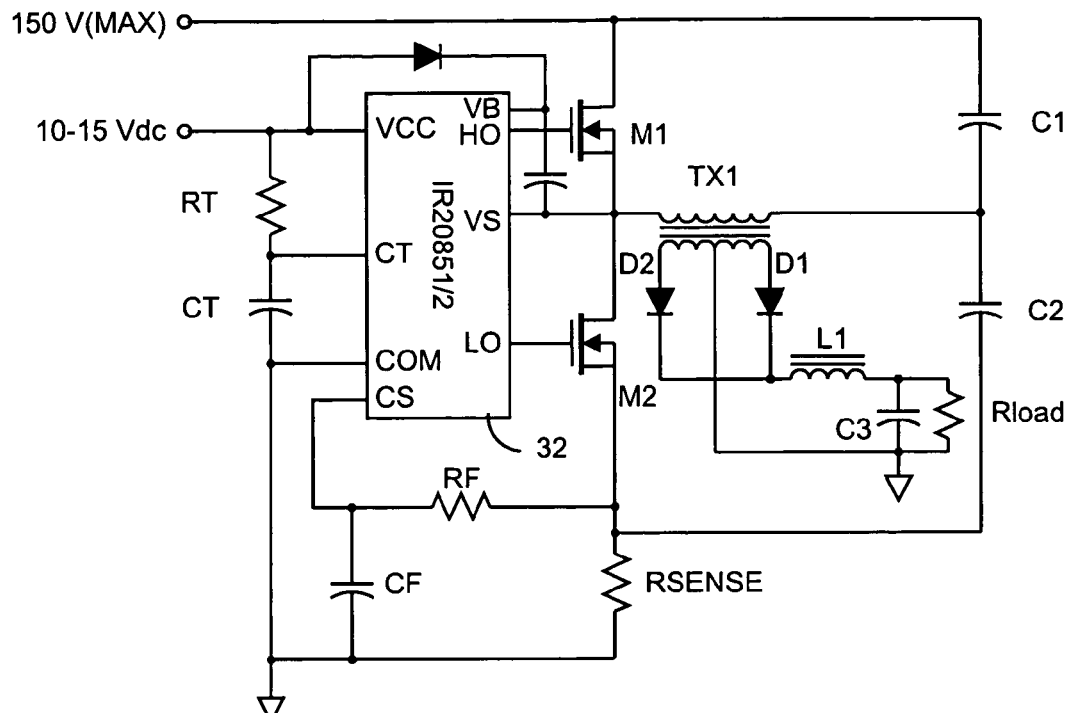
FIG. 7 is a circuit diagram of a half-bridge driver application with a half-bridge driver according to the present invention.

Referring now to FIG. 7, another typical application circuit for half-bridge driver circuit 32 is illustrated. The soft start feature incorporated into driver circuit 32 helps to permit the secondary or load circuit to recover in the event of an overcurrent condition sensed on pin CS.

Figure 8:
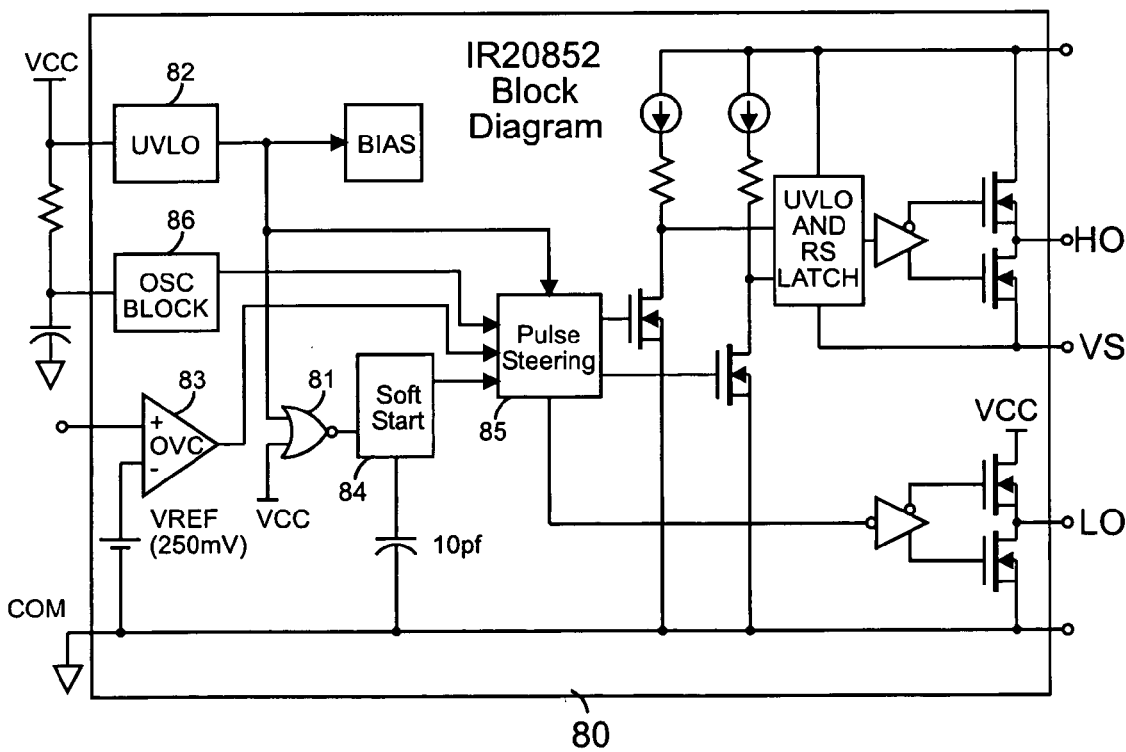
FIG. 8 is an internal schematic block diagram of a half-bridge driver according to the present invention.

Referring now to FIG. 8, a driver circuit 80 is illustrated with a soft start feature that engages only at startup. A norgate 81 is coupled only to the UVLO input signal from UVLO block 82 and to supply voltage VCC so that soft start only engages upon startup rather than on startup and on restart after an overcurrent or overvoltage condition. The output of overcurrent comparator 83 is directly connected to pulse steering block 85 rather than to soft start block 84.

Figure 9:
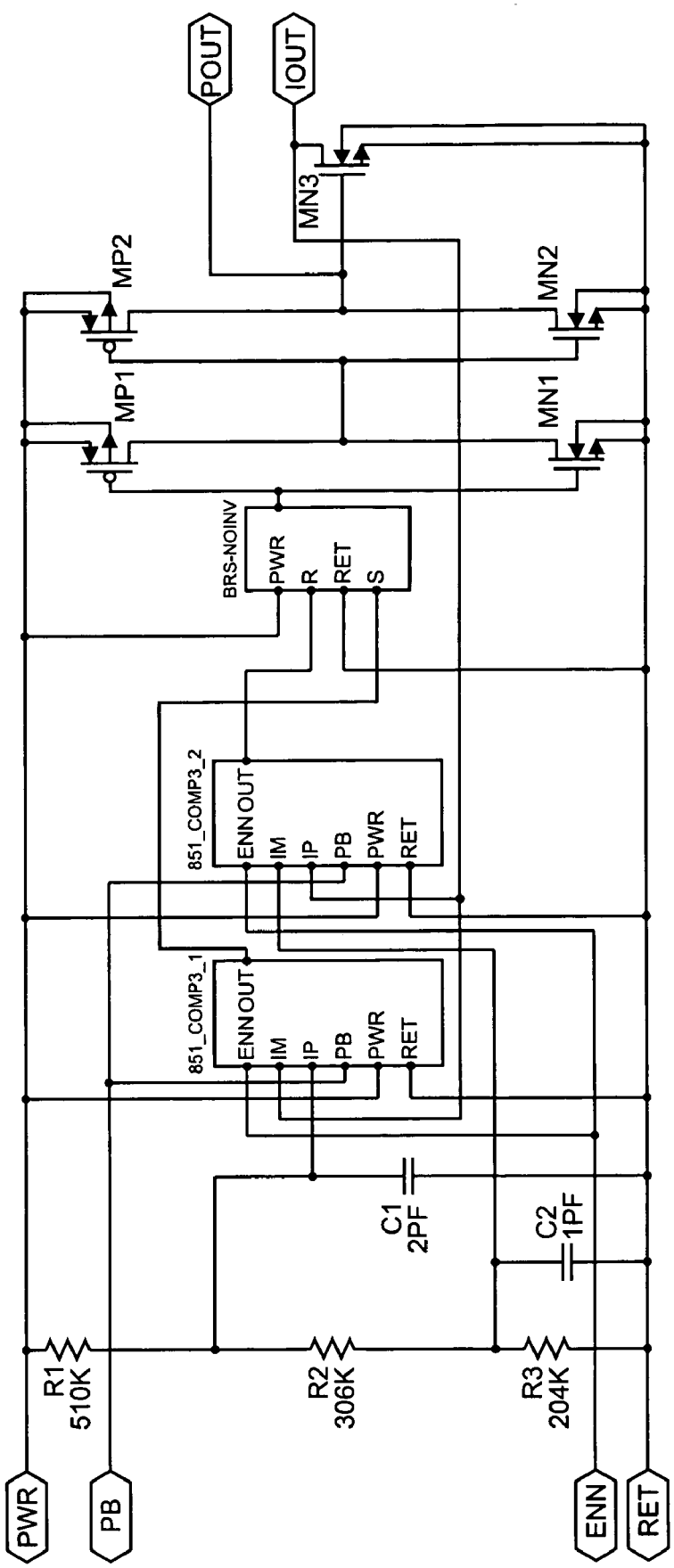
FIG. 9 is a circuit diagram of an oscillator circuit for use with the drivers according to the present invention.

Referring now to FIG. 9, a schematic diagram 90 shows a diagram of an oscillator used in the driver circuits according to the present invention. For example, oscillator 47 in FIG. 4 or oscillator 86 in FIG. 8 may incorporate the oscillator design shown in diagram 90. The oscillator in diagram 90 is referred to as a relaxation oscillator and runs at twice the output pulse frequency. The frequency of the oscillator is determined by external components, such as a timing resistor RT and a timing capacitor CT. The dead time between pulses is determined by the discharge time of capacitor CT through switch MN3. Switch MN3 is sized to obtain a 50 nanosecond discharge time when timing capacitor CT is valued at 100 pf. The oscillator in diagram 90 outputs a narrow pulse train representing the dead time between switching pulses of high and low side switches, with a period representing twice the output frequency. Pulse steering block 45 (FIG. 4) or 85 (FIG. 8) directs the oscillator output, once each output cycle, to the high side and then the low side outputs.

Figure 10:
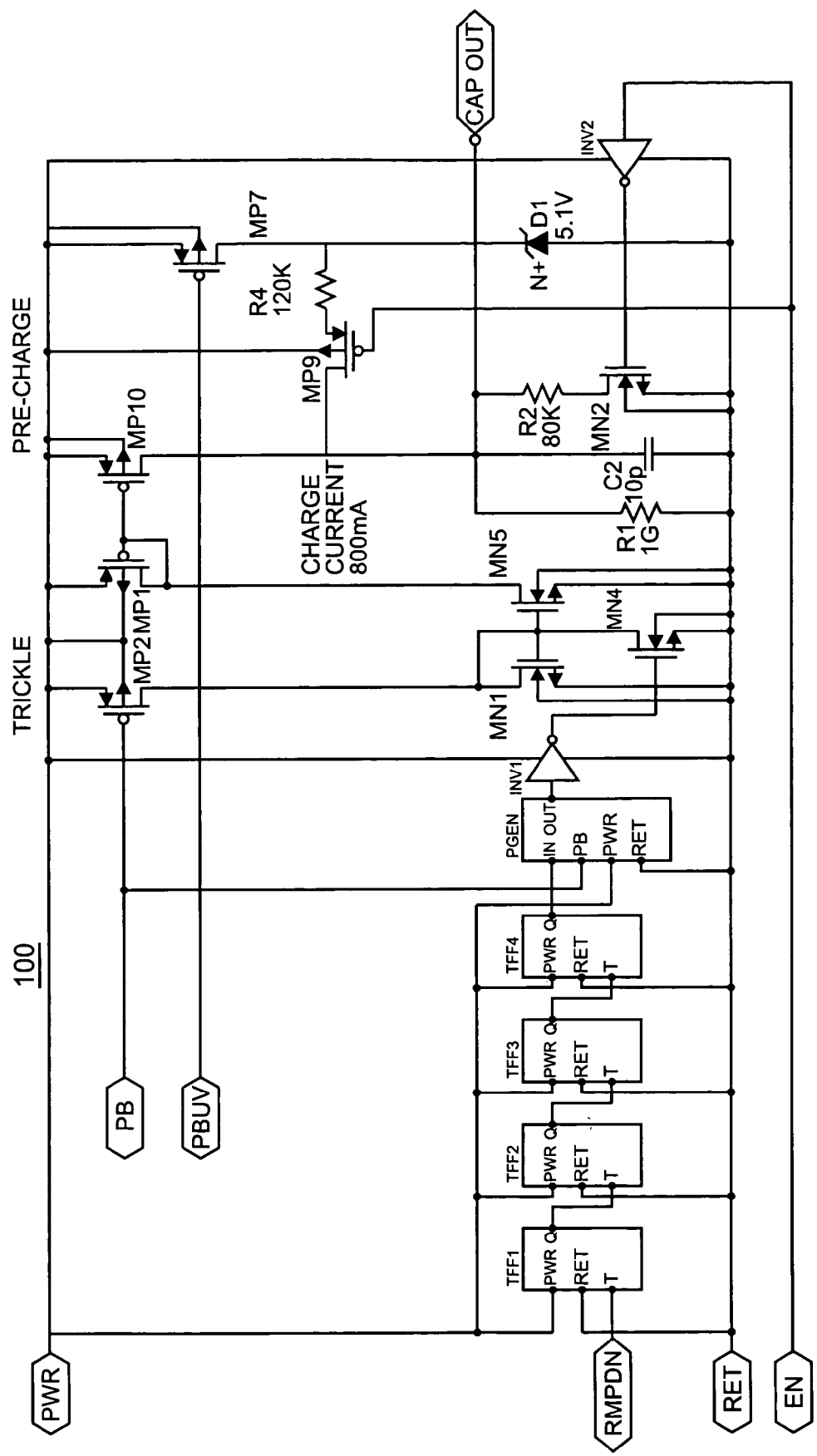
FIG. 10 is a circuit diagram of a soft start circuit for use with the drivers according to the present invention.

Referring now to FIG. 10, soft start operation in the driver circuits according to the present invention is illustrated in circuit diagram 100. The soft start circuit in diagram 100 operates to provide a long soft start time without the use of external large capacitors to save on pin count and external component costs and complexity. When powered up, soft start circuit 100 charges soft start capacitor C2 through switches MP9 and MP10. During this power up phase, capacitor C2 is charged to approximately 1.5 volts DC. The oscillator frequency is divided by 16 and is used to enable a current source through switch MP10 during startup to charge capacitor C2 once every 16 oscillator cycles. The charging current provided through switch MP10 is in the range of approximately 800 nanoamps to 1 microamp. Each time capacitor C2 is charged at the $16^{th}$ oscillator cycle, an incremental voltage appears on capacitor C2 of approximately 25 millivolts. When soft start capacitor C2 is fully charged, its voltage value is approximately 6 volts. Accordingly, a soft start time period of approximately 2500 cycles is obtained. If the oscillator frequency is approximately 500 KHz, or a period of 2.5 microseconds, the soft start time is approximately 6.25 milliseconds. During soft start, the output pulses on the output drivers are maintained to be equal in duration for both the high and low side drivers. In accordance with the various embodiments of the present invention incorporating the soft start feature, the soft start capacitor C2 is precharged after every overcurrent condition detected by overcurrent comparator 42 or 83. According to an alternative embodiment, soft start capacitor C2 is precharged only at power up.

Figure 11:
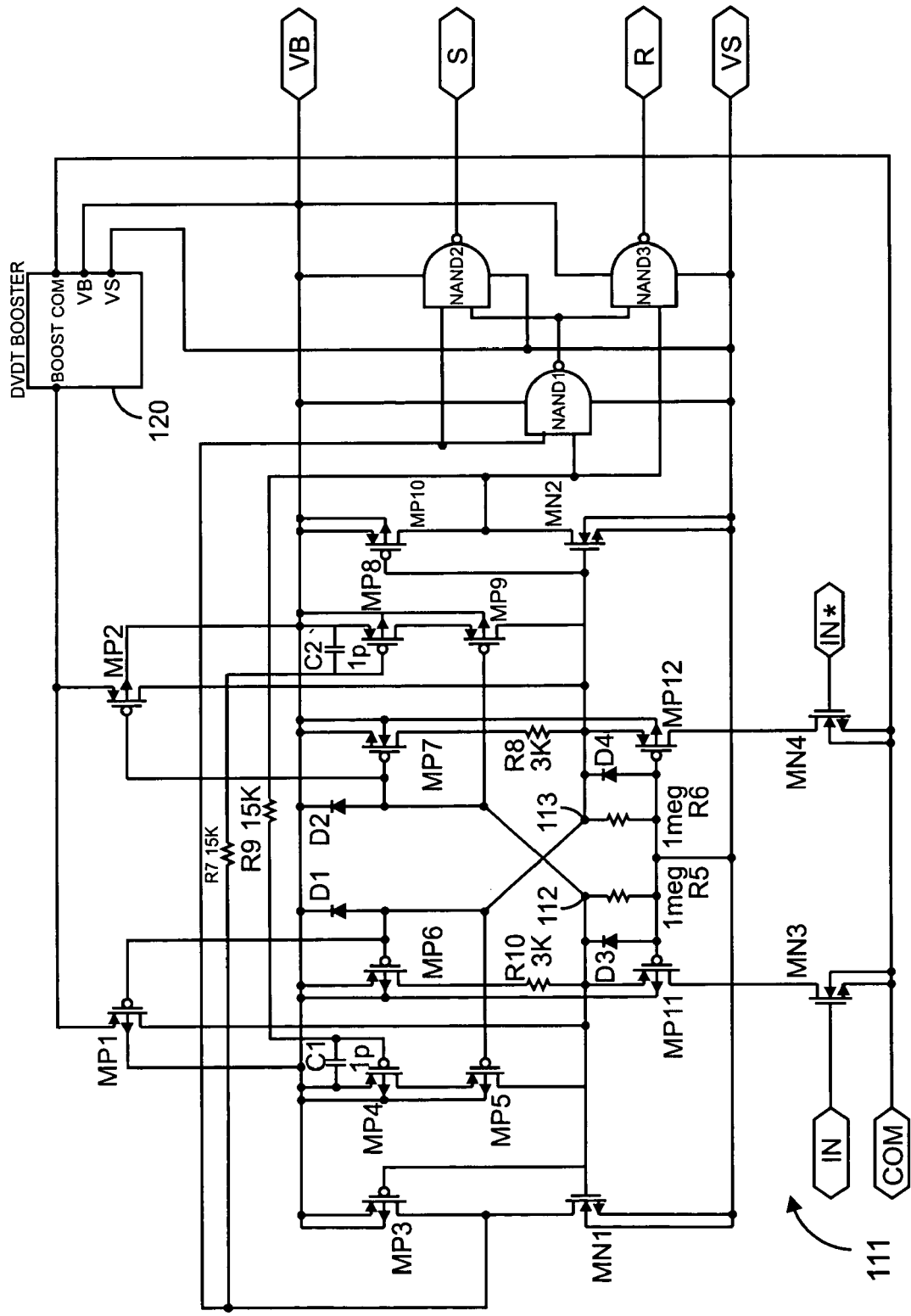
FIG. 11 is a circuit diagram of a high frequency level shift circuit for use with the drivers according to the present invention.

Referring now to FIG. 11, a circuit diagram 110 of a high frequency level shift circuit 111 is illustrated. Level shift circuit 111 receives an input signal in the form of a pulse train that is referenced to a common voltage reference. Level shift circuit 111 modifies the pulse train to be referenced to output voltage reference VS. In addition, the pulse train is converted to set and reset signals output on pins S and R suitable for input to an RS flip flop used to drive a high side output. Level shift circuit 111 also incorporates DV/DT control, as well as a DV/DT booster circuit to improve noise immunity.

Level shift circuit 111 obtains a reduced propagation delay for the input pulses converted and supplied to outputs S and R. Level shift circuit 111 includes enhancement mode transistors MP11 and MP12 that act as voltage limiting circuitry, limiting the potential provided to the gates of shifting transistors MP6 and MP7. Transistor MP11 is connected in series between switching transistor MN3 and shifting transistor MP6 in the first current path and transistor MP12 is connected in series between switching transistor MON. and shifting transistor MP7 in the second current path. Node 112 between transistors MP11 and MP6 is connected to provide potential to the gate of transistor MP7, while node 113 between transistor MP12 and MP7 is connected to provide potential to the gate of transistor MP6. The gates of transistors MP11 and MP12 both receive high side floating supply offset voltage VS and are held in an on condition as a result.

Enhancement mode transistor pair MP4, MP5 operate to inject current in the path between VB and node 112. The injected current reduces the potential across transistor MP6 and resistor R10 by increasing the potential at node 112. Similarly, enhancement mode transistor pair MP8, MP9 inject current in a path between VB and node 113 to reduce the potential across transistor MP7 and resistor R8 by increasing the potential at node 113. The injection of current by the enhancement mode transistor pairs reduces propagation delay and pulse duration, and also serves to reduce power dissipation. The gates of current injecting transistors MP5 and MP9 are connected to receive the same potential as the gates of shifting transistors MP6 and MP7, respectively, which are additionally voltage regulated by diodes D1 and D2. The gate of current injecting transistor MP4 is connected to receive an inverted signal from node 113 through the inverting transistor pair MP10, MN2 and resistor R9. The gate of current injecting transistor MP8 is connected to receive an inverted signal from node 112 through the inverter formed by transistors MP3, MN1 through resistor R7.

Level shift circuit 111 operates as follows. With the initial condition of input IN=0 and input IN*=1, the signal applied to the gate of transistor MP4 is high, and transistor MP4 is off. In this condition, even though transistors MP6 and MP5 are on, no current flows through the current injecting transistor pair between VB and node 112. Conversely, the signal applied to the gate of transistor MP10 is low and transistor MP10 is on. However, because transistors MP7 and MN2 are off, no current flows through the current injecting transistor pair between VB and node 113.

When the input signal makes a low to high transition, a pulse of current as described above begins flowing through resistor R10 in the first current path, driving the potential at node 112 downward. Low potential at node 112 turns on transistors MP7 and MP9, while transistor MP8 was already on. Therefore, current is injected through transistor MP7 and resistor R8 from VB to node 113. Transistor MON. has turned off, preventing current flow through the second current path and allowing the potential at node 113 to rapidly increase to voltage VB. As the potential at node 113 increases, the voltage signal applied to the gate of transistor MP6 goes high and transistor MP6 turns off, stopping the flow of the pulse of current through the first current path. Meanwhile, the voltage applied to the gate of MP8 has gone high, turning off transistor MP8 after an RC delay determined by resistor R7. When transistor MP8 turns off, current injection from voltage VB to node 113 stops, competing a short pulse of current to node 113. When the static current falls to 0, with no current flowing in either current path and with no current injection, the circuit is stable until a high to low input transition occurs.

When the input signal then makes a high to low transition, a pulse of current as described above begins flowing through resistor R8 in the second current path, driving the potential at node 113 downward. A low potential at node 113 turns on transistors MP6 and MP5, while transistor MP4 was already on. Therefore, current is injected through transistor MP6 and resistor R10 from VB to node 112. As above, transistor MN3 has turned off, preventing current flow through the first current path and allowing potential at node 112 to rapidly increase to voltage VB. As potential at node 112 increases, the voltage applied to the gate of transistor MP7 goes high and transistor MP7 turns off, stopping flow of the pulse of current through the second current path. Meanwhile, the voltage applied to the gate of transistor MP4 has gone high, turning off transistor MP4 after an RC delay determined by resistor R9. When transistor MP4 turns off, current injection from voltage VB to node 112 stops, completing a short pulse of current to node 112. When the static current falls to 0, with no current flowing in either current path, and no current injection, the circuit is stable until a low to high input transition occurs.

By operating level shift circuit 111 on the basis of current flow through two current paths using shifting and switching circuitry, the propagation delay normally associated with constant pulse with signals is dramatically reduced. In addition, because of the reduction in propagation delay, the dissipation of power in level shift circuit 111 is greatly reduced. Each of these advantages contribute to permitting level shift circuit 111 to operate at a higher frequency.

Figure 12:
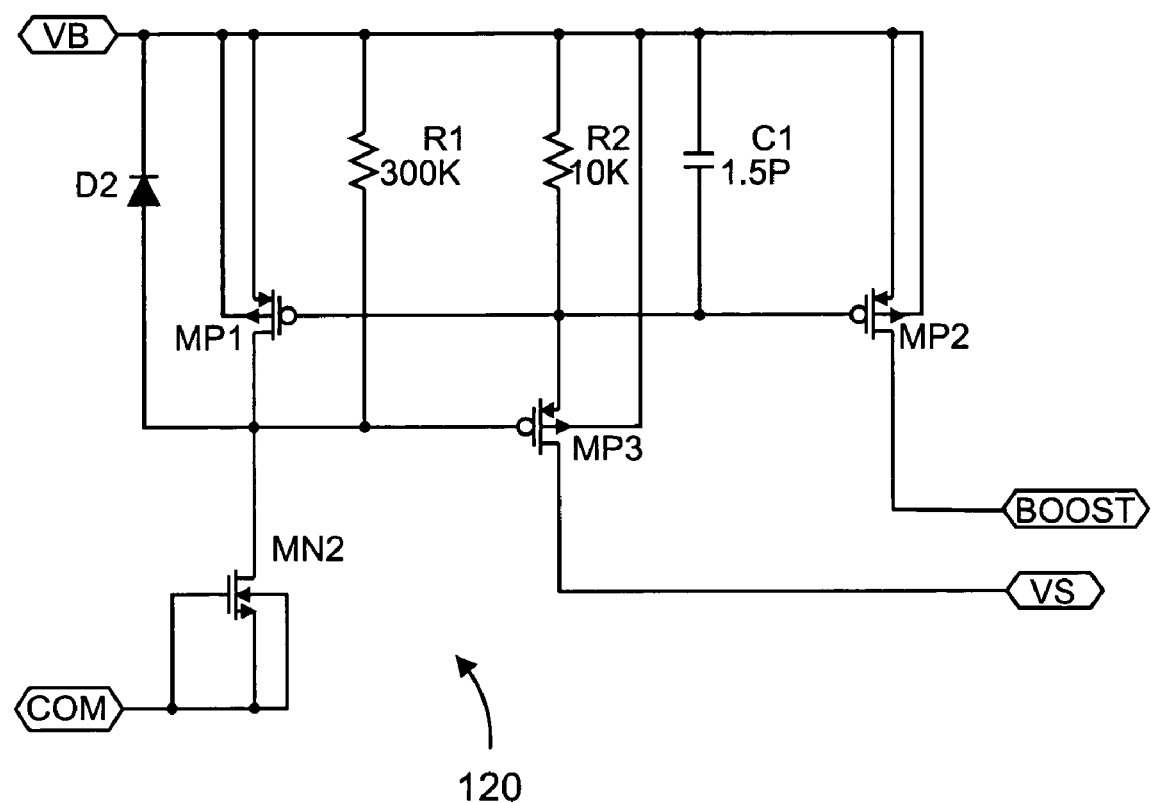
FIG. 12 is a circuit diagram of a DV/DT booster circuit for use with the drivers according to the present invention.

Referring now to FIG. 12, a DV/DT booster circuit 120 is illustrated. Booster circuit 120 is illustrated in block diagram form in FIG. 11. Booster circuit 120 contributes to suppressing false operation of level shift circuit 111 due to noise transients, and is described in greater detail in U.S. Pat. No. 6,611,154, the contents of which are hereby incorporated herein by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An IC controller for operating a transistor half bridge having two series connected transistors, comprising:
   an oscillator circuit for supplying a fixed frequency sawtooth oscillation signal and a first pulse signal at the fixed frequency;
   a soft start circuit coupled to the oscillator to receive the oscillation signal and produce a pulse length modifying signal to modify a second pulse signal derived from the oscillation signal to vary a length of a pulse in the second pulse signal;
   the soft start circuit being selectively operable to modify the second pulse signal; and
   a pulse steering circuit providing the second pulse signal, the second pulse signal comprising two complementary pulse signals, the pulse steering circuit inserting a dead time between the complementary pulse signals for driving the transistors of the half bridge in accordance with a width of pulses in the first pulse signal;
   a driver circuit for receiving the second pulse signal and providing outputs suitable for operating the transistors, and
   wherein the output of the soft start circuit is added together with the sawtooth oscillation signal to vary the width of pulses supplied to the driver circuit in a soft start mode.

2. The IC controller according to claim 1, further comprising a comparator in the soft start circuit for comparing the sawtooth oscillation signal to a reference signal to modify the second pulse signal when the soft start circuit is selectively operated.

3. The IC controller according to claim 2, wherein the reference signal changes during the comparison with the sawtooth oscillation signal.

4. The IC controller according to claim 1, further comprising an overcurrent detection circuit for disabling the second pulse signal or the driver circuit when an overcurrent condition is detected.

5. The IC controller according to claim 1, further comprising a pulse signal disabling circuit, wherein the disabling circuit is operable to disable the second pulse signal for a predetermined period of time after a fault event occurs.

6. The IC controller according to claim 1, further comprising a level shifting circuit for translating the second pulse signal from one reference voltage to another reference voltage.

7. An IC controller for operating a transistor to switch at a fixed frequency, comprising:
   an oscillator circuit for supplying a fixed frequency oscillation signal;
   a soft start circuit coupled to the oscillator to receive the oscillation signal and produce a pulse length modifying signal to modify a pulse signal derived from the oscillation signal to vary a length of a pulse in the pulse signal;
   the soft start circuit being selectively operable to modify the pulse signal;
   a driver circuit for receiving the pulse signal and providing an output suitable for operating the transistor;
   a level shifting circuit for translating the pulse signal from one reference voltage to another reference voltage; and
   further comprising a DV/DT boost circuit coupled to the level shifting circuit for improving noise immunity in the level shifting circuit.

8. An IC controller for operating a transistor to switch at a fixed frequency, comprising:
   an oscillator circuit for supplying a fixed frequency oscillation signal;
   a soft start circuit coupled to the oscillator to receive the oscillation signal and produce a pulse length modifying signal to modify a pulse signal derived from the oscillation signal to vary a length of a pulse in the pulse signal;
   the soft start circuit being selectively operable to modify the pulse signal;
   a driver circuit for receiving the pulse signal and providing an output suitable for operating the transistor;
   further comprising an overcurrent detection circuit for disabling the pulse signal or the driver circuit when an overcurrent condition is detected; and
   a pulse signal disabling circuit coupled to the overcurrent detection circuit and operable to disable the pulse signal for a predetermined period of time after an overcurrent condition is detected.

* * * * *